United States Patent
Uceda-Sosa et al.

(10) Patent No.: US 6,496,840 B1
(45) Date of Patent: Dec. 17, 2002

(54) METHOD, SYSTEM AND PROGRAM PRODUCTS FOR ATOMICALLY AND PERSISTENTLY SWAPPING RESOURCE GROUPS

(75) Inventors: Rosario A. Uceda-Sosa, Hartsdale, NY (US); Steven R. Champagne, Poughkeepsie, NY (US); Kailash N. Marthi, Poughkeepsie, NY (US); Gregory D. Laib, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 323 days.

(21) Appl. No.: 09/584,300

(22) Filed: May 31, 2000

(51) Int. Cl.[7] ............................................... G06F 17/30
(52) U.S. Cl. ...................................................... 707/204
(58) Field of Search ................................. 707/201, 203, 707/204; 711/162; 714/6, 15, 21; 717/171

(56) References Cited

U.S. PATENT DOCUMENTS

| | | | |
|---|---|---|---|
| 5,325,519 A | * | 6/1994 | Long et al. ..................... 714/15 |
| 5,797,016 A | | 8/1998 | Chen et al. .................. 717/171 |
| 6,016,553 A | * | 1/2000 | Schneider et al. ............. 714/21 |
| 6,173,376 B1 | * | 1/2001 | Fowler et al. ............... 711/162 |

FOREIGN PATENT DOCUMENTS

GB    2301205 A    11/1996    ........... G06F/11/14

OTHER PUBLICATIONS

"Automatic file backup of last edit", http://www.micro-emacs.de/me/m2mod001.htm, pp. 1–2.

* cited by examiner

Primary Examiner—Diane D. Mizrahi
Assistant Examiner—Apu M. Mofiz
(74) Attorney, Agent, or Firm—Lawrence D. Cutter, Esq.; Blanche E. Schiller, Esq.; Heslin Rothenberg Farley & Mesiti P.C.

(57) ABSTRACT

Write requests are performed against one or more resources of a resource group in a persistent and atomic manner. When a write request is received, a backup resource group is updated to reflect data in a current resource group. Thereafter, the write request is performed against the backup resource group. After successfully performing the write operation(s), the backup resource group and the current resource group are swapped in an atomic, consistent manner, such that the backup resource group is now the new current resource group.

41 Claims, 4 Drawing Sheets

METHOD, SYSTEM AND PROGRAM PRODUCTS FOR ATOMICALLY AND PERSISTENTLY SWAPPING RESOURCE GROUPS

TECHNICAL FIELD

This invention relates, in general, to processing within a computing environment, and in particular, to providing a consistent, persistent and atomic swap of resource groups.

BACKGROUND ART

Data integrity is one of the most important concerns that arises when executing operations within a computing environment. In particular, it is crucial not to lose any type of data modifications. If a system within the computing environment fails, it is typically imperative to have adequate recovery scenarios.

In order to provide proper recovery, it is customary to maintain a backup of the data. In one example, this backup is performed periodically. Further, changes to the data are written to log files that track what has occurred, since the last backup. During a recovery, the backup is used, as well as the log files, to reconstruct the operations that took place prior to the failure, and to restore the data.

Although efforts have been made to provide adequate backups, further improvements are needed. For example, a capability is needed to provide a backup of data that is platform independent, provided at an application level and is efficient.

SUMMARY OF THE INVENTION

The shortcomings of the prior art are overcome and additional advantages are provided through the provision of a method of managing modifications to resource groups of a computing environment. The method includes, for instance, executing a current modification request on one or more resources of a backup resource group; and atomically swapping the modified backup resource group and a current resource group, such that the modified backup resource group becomes the current resource group, and wherein the atomically swapping includes changing one or more names of the backup resource group without affecting the lengths of one or more names.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with at least one aspect of the present invention, modifications to one or more resources (e.g., files, tables, objects, etc.) of a group of resources are performed atomically and persistently. In particular, a consistent, persistent and atomic swap of two or more sets of resources is provided.

Figure 1:
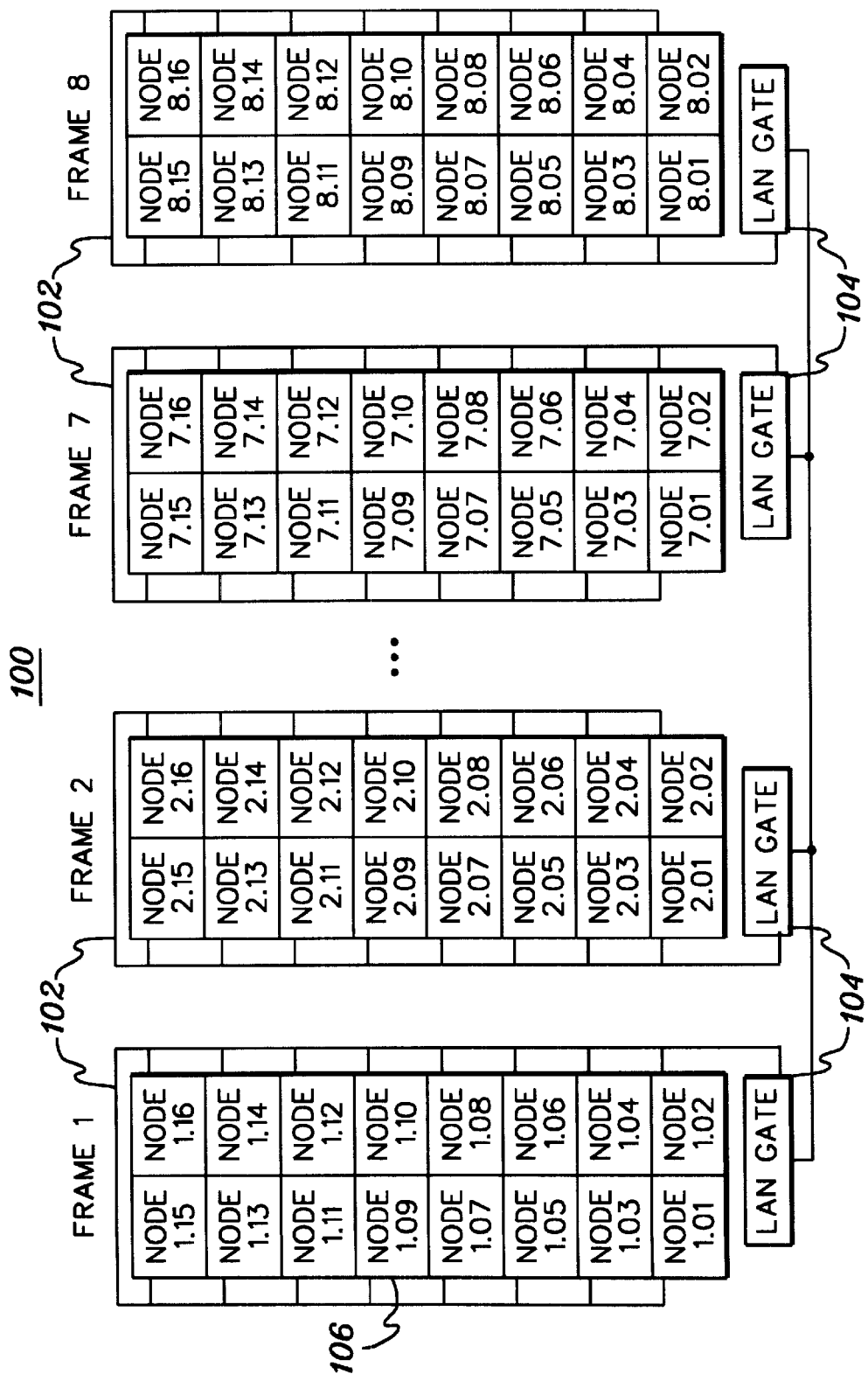
FIG. 1 depicts one embodiment of a computing environment incorporating and using aspects of the present invention.

One example of a computing environment incorporating and using aspects of the present invention is depicted in FIG. 1 and described herein. A distributed computing environment 100 includes, for instance, a plurality of frames 102, coupled to one another via a plurality of LAN gates 104. Frames 102 and LAN gates 104 are described in detail herein.

In one example, distributed computing environment 100 includes eight (8) frames, each of which includes a plurality of processing nodes 106. In one instance, each frame includes sixteen (16) processing nodes (each having one or more processors). Each processing node is, for instance, a RISC/6000 computer running AIX, a UNIX based operating system. Each processing node within a frame is coupled to the other processing nodes of the frame, via for example, an internal LAN connection. Additionally each frame is coupled to the other frames via LAN gates 104.

As examples, each LAN gate 104 includes either a RISC/6000 computer, any computer network connection to the LAN, or a network router. However, these are only examples. It would be apparent to those skilled in the relevant art that there are other types of LAN gates, and that other mechanisms can also be used to couple the frames to one another.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. For example, this invention can be employed with LINUX and/or Windows operating systems. Further, a heterogeneous environment can include and utilize aspects of the invention in which one or more of the nodes and/or operating systems of the environment are distinct from other nodes or operating systems of the environment. The nodes of such a heterogeneous environment interoperate, in that they collaborate and share resources with each other. All of these variations are considered a part of the claimed invention.

Users of the distributed computing environment write data to and read data from resources (such as files, tables, objects, etc.) stored within nodes of the computing environment or storage coupled thereto. In one example, operations are performed on a set of logically related resources. This set of resources is referred to herein as a resource group. The resources of a resource group are accessed by the users, which perform read or write operations against them. Whenever a write request is performed against one or more resources of the resource group, the change is performed persistently and atomically, in accordance with an aspect of the present invention.

In order to perform the change persistently and atomically, at least two resource groups are maintained. One resource group represents a current state of the resources, and is referred to as the current resource group; and another resource group represents a backup or shadow version of the resources, and is referred to as a backup (or working) resource group.

Figure 2:
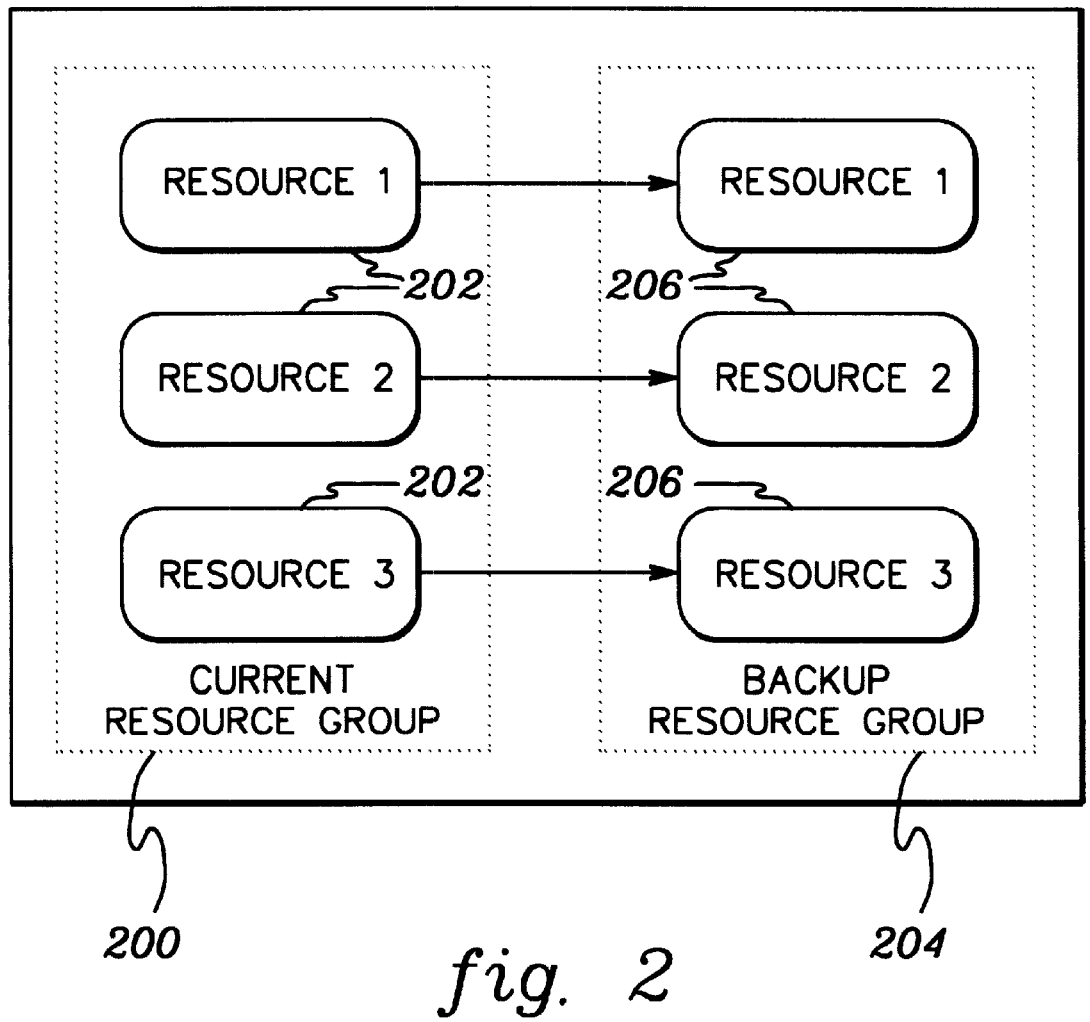
FIG. 2 depicts one example of a current resource group and its backup copy, in accordance with an aspect of the present invention.

As depicted in FIG. 2, a current resource group 200 has one or more resources 202, and a backup resource group 204 has a replication of those resources 206. When one or more of the resources of a resource group are to be updated, the updates are performed in the backup resource group, and then the resource groups are atomically swapped, in accordance with aspects of the present invention.

Figure 3:
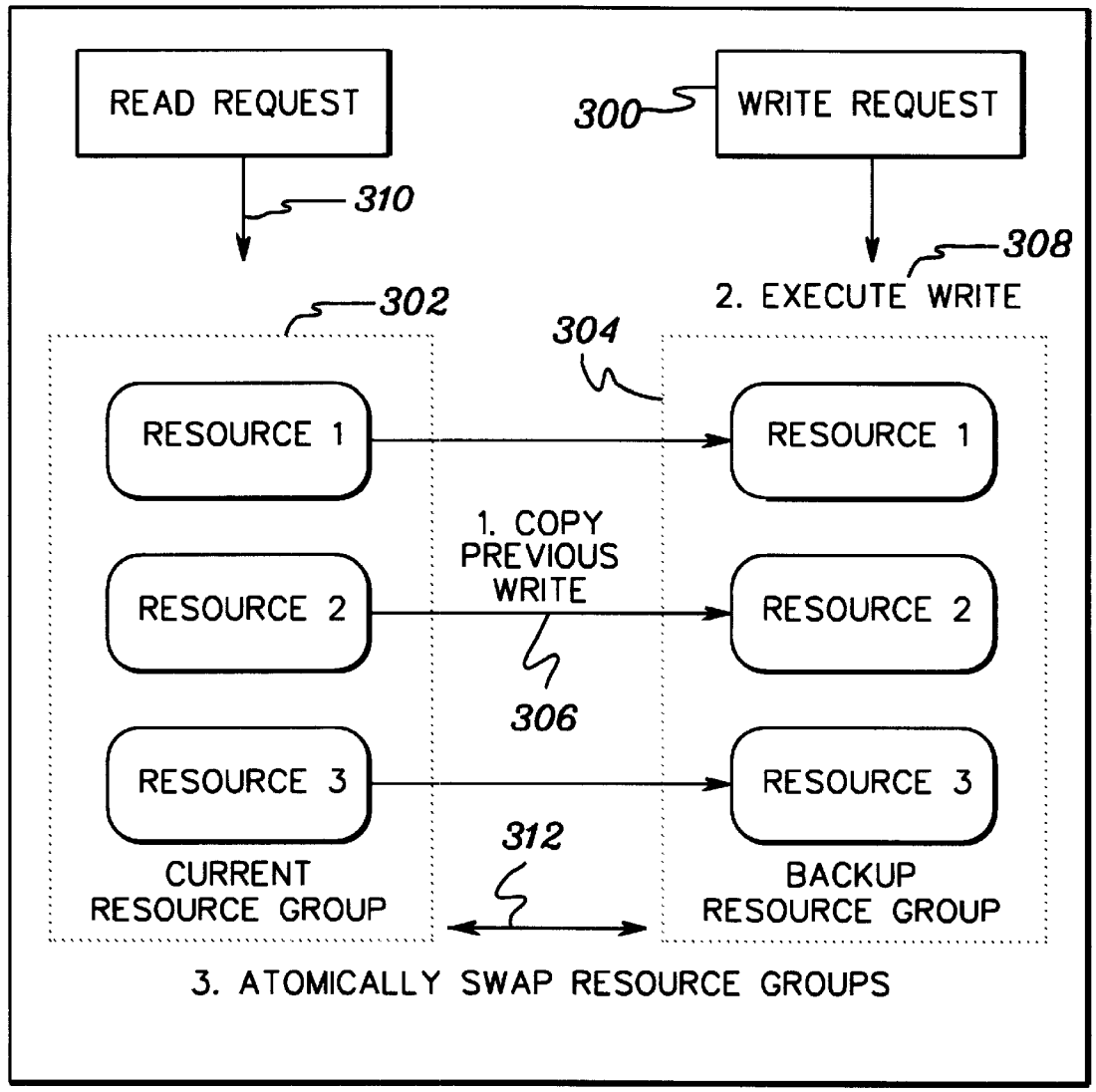
FIG. 3 is a graphical illustration of various steps performed to modify resources of a resource group in an atomic and persistent manner, in accordance with an aspect of the present invention.

One embodiment of the logic associated with modifying a resource in an atomic, consistent and persistent manner is described with reference to FIG. 3. In one example, this logic is performed by a function within a node (e.g., a server).

Initially, a user forwards, for instance, a write request 300 (as one example) to a node of the computing environment. When the request is received by the node, logic within the node perform a number of operations. For example, the node copies zero or more previous modifications from a current resource group 302 to a backup resource group 304, STEP 306. In particular, the backup resource group is updated to reflect the data in the current resource group. This can be done by keeping both resource groups updated in lockstep. In particular, at any time, the two groups are different by only the modifications introduced in the last write operation. Thus, the backup resource group is updated with the previous write operation.

Subsequent to updating the backup resource group so that it reflects the data in the current resource group, the node executes the new write request against the backup resource group, STEP 308. In the meantime, any read requests can proceed on the current resource group, in parallel, STEP 310.

Once the write operation has concluded successfully, the backup and current resource groups are swapped, STEP 312. In one embodiment, the swap is performed in an atomic manner, so that if the system fails or an error occurs during the swap operation, a consistent state of the resources can still be obtained by a recovery procedure or in the next initialization of the system.

In one example, the atomic swap is performed by a renaming of the resources. In particular, each of the resources has a name associated therewith, and each name has a suffix, which indicates the version of the resource. As one example, the possible version suffixes are 0.0, 0.1 and 0.2, and the digits are ordered modulo 3. That is 0<1, 1<2 and 2<0. The highest version in the order represents a current version of the resource, while the lowest version indicates that the resource belongs to the backup resource group. Thus, it is possible to determine based on the version suffixes of the resources, which resources correspond to the current version.

In accordance with an aspect of the present invention, the version numbers are toggled using a minimum number of resource operations in order to provide atomicity of the changes. One example of the toggling is further described with reference to FIG. 4, which depicts one particular example.

Figure 4:
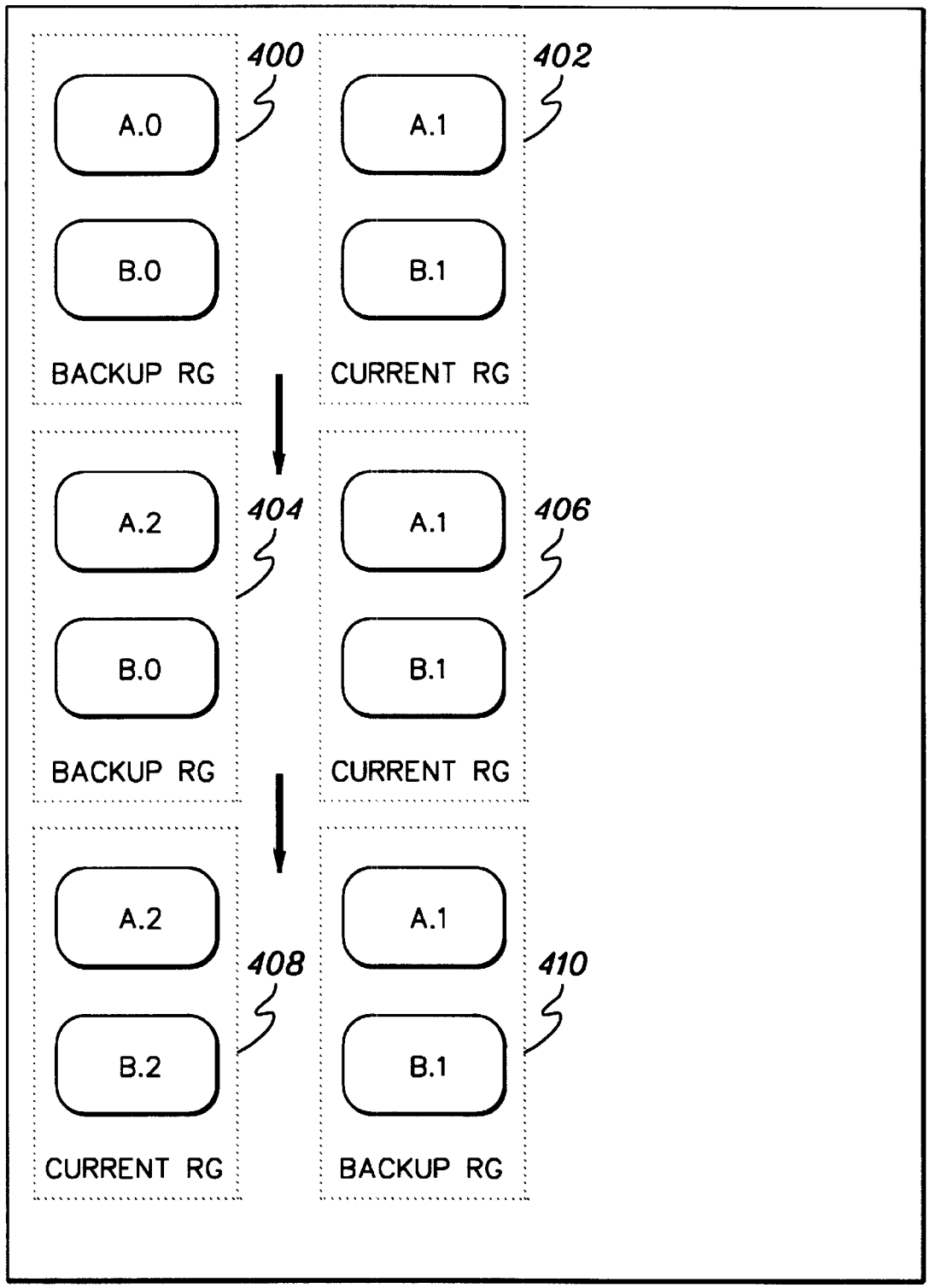
FIG. 4 is a graphical illustration of the atomic swap of current and backup resource groups, in accordance with an aspect of the present invention.

Assume, in the example of FIG. 4, that there are two (2) resource groups 400 and 402, and each group has two resources, called A and B. Thus, the backup resource group includes Resources A.0 and B.0, while the current group includes Resources A.1 and B.1. At initialization time, both the resource sets contain the same information, in this example.

Next, a write operation is requested. The write operation takes place in the backup (or working) resource group (which has been updated to reflect the contents of the current resource group). If the update is successful, data is saved, for instance, to disk in the resources with the lowest version. In this example, it is version 0. If no errors occur, the backup group now contains the current version of the resource group. Thus, the lowest version is renamed to the highest version, using the mod 3 order.

In particular, in one example, the renaming of the resources is performed in the same order, for instance, lexicographically. Thus, in this case, Resource A.0 is first renamed to A.2, (see reference numeral 404), while the names of the current resource group remain unchanged (see reference numeral 406). Then, Resource B.0 is renamed to B.2 (see reference numeral 408). The successful renaming of the last resource of a group completes the atomic swap of the current and backup groups. Thus, Resources A.2 and B.2 are now a part of the new current resource group (408), and Resources A.1 and B.1 are members of the new backup resource group 410.

Described in detail above is an atomic swap of current and backup resource groups. In the examples described herein, although the names of the resources are being modified, the length of the names are kept constant (this is the reason for the modulo 3 arithmetic). Typically, in file systems, such as UNIX, the name change involves a modification of the I-node or equivalent resource structure definition. Even if the file system is full, this modification can be safely carried out.

It is the last (in this case the second) rename operation, which constitutes the atomic swap of the resource groups. If the previous operations were successful, the resource group is considered updated. Thus, the backup resource group is now the current resource group and vice versa. If the service controlling the resource goes down, data can be recovered by declaring the higher version to be the current version.

If a resource group has more than two resources, for instance, n resources, then the rename operation of the last resource is considered the atomic swap of the resource groups. Further, if a failure had occurred after renaming one or more, but less than all of the resources of a particular resource group, then there would be an inconsistent resource group version. Thus, the inconsistent resource group version is declared corrupted, and the other version is still considered the current version. This is because the current version has the highest version that is consistent (that is, a resource group is consistent if there is a set of all of its resources with the same version).

The use of modulo (n) arithmetic and ordering to provide atomic swapping of resources can be used in many scenarios, regardless of whether one of the resource groups is the target of a write operation. Further, the techniques described herein are equally applicable to resource groups having n resources. The resources are to be renamed using a predefined order and the renaming of the last resource in that order is considered the atomic action that swaps both resources. When using this technique with n resource groups, arithmetic modulo (n+1) is used. The arithmetic can be used to sort n sets of resources.

The present invention is also applicable to resource groups, in which there is not always a correspondence between resources in both groups; particularly, if the driver program can identify at least two resources in each resource group. In that case, the first of the pair of two resources is renamed at the beginning, and the last of the pair is renamed at the end, so that in the case of a system shutdown, the pairs can be compared to determine if their versions are compatible. Again, the resource group with a highest pair that has a compatible version is declared the current resource group.

The facility of the present invention advantageously provides a platform independent, application-level technique that provides all-or-nothing semantics at the atomicity level of the underlying operating system, by providing a fixed-size naming scheme and a technique that determines which version of the resource group is the current version. Furthermore, the facility of the present invention provides that at least one consistent version of the resource group will be found without using any extra resources (e.g., files), which can compromise the integrity of the data (i.e., if the control file is corrupted, so is the data itself).

Aspect of the invention are applicable to any scenarios in which a current version and a backup version of data is to be maintained in a consistent manner. In one example, the technique is used for a relational data repository, where one table is to be stored as a set of resources and atomic write operations are to be supported, regardless of how extensive. One example of a relational data repository is described in U.S. Patent Application entitled "Method, System And Program Products Of Managing A Clustered Computing Environment," Novaes et al., Ser, No. 09/583/677, filed May 31, 2000, which is hereby incorporated herein by reference in its entirety.

The present invention is not limited to distributed computing environments, but can be used with any computing environments, including single system environments. Further, one or more aspects of the present invention are applicable to homogeneous systems, as well as heterogeneous systems. As one example, capabilities are provided to facilitate the interoperability of the systems of a heterogeneous environment.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing modifications to resource groups of a computing environment, said method comprising:

executing a current modification request on one of more resources of a backup resource group; and atomically swapping the modified backup resource group and a current resource group, such that the modified backup resource group becomes the current resource group, and wherein the atomically swapping comprises changing one or more names of said backup resource group without affecting the lengths of the one or more names.

2. The method of claim 1, further comprising updating one or more resources of said backup resource group, prior to executing the current modification request.

3. The method of claim 2, wherein said updating comprises copying one or more modifications of the one or more resources from the current resource group to the backup resource group.

4. The method of claim 1, wherein said changing one or more names of the backup resource group comprises updating one or more names of one or more resources of said backup resource group.

5. The method of claim 4, wherein said updating the one or more names comprises changing a suffix of each name to be updated.

6. The method of claim 5, wherein said changing the suffix comprises using modulo arithmetic to change the suffix.

7. The method of claim 4, wherein said updating is performed in a predefined order, and wherein when the name of a last resource of the predefined order is updated, the atomic swap is complete.

8. The method of claim 1, wherein said changing one or more names comprises changing the one or more names in a predefined order, wherein a changing of the last name in the predefined order indicates completion of the atomic swap.

9. The method of claim 1, wherein said changing one or more names comprises using modulo arithmetic to change one or more suffixes of the one or more names.

10. The method of claim 1, wherein the atomically swapping is performed independent of a platform of the computing environment.

11. A system of managing modifications to resource groups of a computing environment, said system comprising:

means for executing a current modification request on one or more resources of a backup resource group; and means for atomically swapping the modified backup resource group and a current resource group, such that the modified backup resource group becomes the current resource group, and wherein said means for atomically swapping comprises means for changing one or more names of said backup resource group without affecting the lengths of the one or more names.

12. The system of claim 11, further comprising means for updating one or more resources of said backup resource group, prior to executing the current modification request.

13. The system of claim 12, wherein said means for updating comprises means for copying one or more modifications of the one or more resources from the current resource group to the backup resource group.

14. The system of claim 11, wherein said means for changing one or more names of the backup resource group comprises means for updating one or more names of one or more resources of said backup resource group.

15. The system of claim 14, wherein said means for updating the one or more names comprises means for changing a suffix of each name to be updated.

16. The system of claim 15, wherein said means for changing the suffix comprises means for using modulo arithmetic to change the suffix.

17. The system of claim 14, wherein said means for updating is performed in a predefined order, and wherein when the name of a last resource of the predefined order is updated, the atomic swap is complete.

18. The system of claim 11, wherein said means for changing one or more names comprises means for changing the one or more names in a predefined order, wherein a changing of the last name in the predefined order indicates completion of the atomic swap.

19. The system of claim 11, wherein said means for changing one or more names comprises means for using modulo arithmetic to change one or more suffixes of the one or more names.

20. The system of claim 11, wherein the atomically swapping is performed independent of a platform of the computing environment.

21. At least one program storage device readable by a machine, tangibly embodying at least one program of instructions executable by the machine to perform a method of managing modifications to resource groups of a computing environment, said method comprising:
    executing a current modification request on one or more resources of a backup resource group; and
    atomically swapping the modified backup resource group and a current resource group, such that the modified backup resource group becomes the current resource group, and wherein the atomically swapping comprises changing one or more names of said backup resource group without affecting the lengths of the one or more names.

22. The at least one program storage device of claim 21, wherein said method further comprises updating one or more resources of said backup resource group, prior to executing the current modification request.

23. The at least one program storage device of claim 22, wherein said updating comprises copying one or more modifications of the one or more resources from the current resource group to the backup resource group.

24. The at least one program storage device of claim 21, wherein said changing one or more names of the backup resource group comprises updating one or more names of one or more resources of said backup resource group.

25. The at least one program storage device of claim 24, wherein said updating the one or more names comprises changing a suffix of each name to be updated.

26. The at least one program storage device of claim 25, wherein said changing the suffix comprises using modulo arithmetic to change the suffix.

27. The at least one program storage device of claim 24, wherein said updating is performed in a predefined order, and wherein when the name of a last resource of the predefined order is updated, the atomic swap is complete.

28. The at least one program storage device of claim 21, wherein said changing one or more names comprises changing the one or more names in a predefined order, wherein a changing of the last name in the predefined order indicates completion of the atomic swap.

29. The at least one program storage device of claim 21, wherein said changing one or more names comprises using modulo arithmetic to change one or more suffixes of the one or more names.

30. The at least one program storage device of claim 21, wherein the atomically swapping is performed independent of a platform of the computing environment.

31. A method of managing modifications to resource groups of a computing environment, said method comprising:
    receiving a modification request for at least one resource of a backup resource group;
    updating, using data of a current resource group, one or more resources of the backup resource group;
    executing the modification request on the at least one resource of the backup resource group; and
    atomically swapping the modified backup resource group and the current resource group, such that the modified backup resource group becomes the current resource group, wherein the atomically swapping comprises changing one or more names of one or more resources of the backup resource group without affecting the lengths of the one or more names.

32. The method of claim 31, wherein the changing the one or more names comprises using modulo arithmetic to change one or more suffixes of the one or more names.

33. The method of claim 32, wherein said changing one or more names comprises changing the one or more names in a predefined order, wherein a changing of the last name in the predefined order indicates completion of the atomic swap.

34. A system of managing modifications to resource groups of a computing environment, said system comprising:
    means for receiving a modification request for at least one resource of a backup resource group;
    means for updating, using data of a current resource group, one or more resources of the backup resource group;
    means for executing the modification request on the at least one resource of the backup resource group; and
    means for atomically swapping the modified backup resource group and the current resource group, such that the modified backup resource group becomes the current resource group, wherein the means for atomically swapping comprises means for changing one or more names of one or more resources of the backup resource group without affecting the lengths of the one or more names.

35. The system of claim 34, wherein the means for changing the one or more names comprises means for using modulo arithmetic to change one or more suffixes of the one or more names.

36. The system of claim 35, wherein said means for changing one or more names comprises means for changing the one or more names in a predefined order, wherein a changing of the last name in the predefined order indicates completion of the atomic swap.

37. A system of managing modifications to resource groups of a computing environment, said system comprising:
    a current modification request on one or more resources of a backup resource group; and
    a node to atomically swap the modified backup resource group and a current resource group, such that the modified backup resource group becomes the current resource group, and wherein the atomically swapping comprises changing one or more names of said backup resource group without affecting the lengths of the one or more names.

38. A system of managing modifications to resource groups of a computing environment, said system comprising:

a modification request for at least one resource of a backup resource group;

data of a current resource group used to update one or more resources of the backup resource group;

a node to execute the modification request on the at least one resource of the backup resource group; and said node to atomically swap the modified backup resource group and the current resource group, such that the modified backup resource group becomes the current resource group, wherein the atomically swapping comprises changing one or more names of one or more resources of the backup resource group without affecting the lengths of the one or more names.

39. At least one program storage device readable by a machine, tangibly embodying at least one program of instructions executable by the machine to perform a method of managing modifications to resource groups of a computing environment, said method comprising:

receiving a modification request for at least one resource of a backup resource group;

updating, using data of a current resource group, one or more resources of the backup resource group;

executing the modification request on the at least one resource of the backup resource group; and atomically swapping the modified backup resource group and the current resource group, such that the modified backup resource group becomes the current resource group, wherein the atomically swapping comprises changing one or more names of one or more resources of the backup resource group without affecting the lengths of the one or more names.

40. The at least one program storage device of claim 39, wherein the changing the one or more names comprises using modulo arithmetic to change one or more suffixes of the one or more names.

41. The at least one program storage device of claim 40, wherein said changing one or more names comprises changing the one or more names in a predefined order, wherein a changing of the last name in the predefined order indicates completion of the atomic swap.

* * * * *